US012444066B2

United States Patent
Chen et al.

(10) Patent No.: US 12,444,066 B2
(45) Date of Patent: Oct. 14, 2025

(54) MODEL GENERATION METHOD AND APPARATUS BASED ON MULTI-VIEW PANORAMIC IMAGE

(71) Applicant: KANDAO TECHNOLOGY CO., LTD., Shenzhen (CN)

(72) Inventors: Dan Chen, Shenzhen (CN); Yuyao Zhang, Shenzhen (CN); Zhigang Tan, Shenzhen (CN)

(73) Assignee: KANDAO TECHNOLOGY CO., LTD., Shenzhen (CN)

( * ) Notice: Subject to any disclaimer, the term of this patent is extended or adjusted under 35 U.S.C. 154(b) by 547 days.

(21) Appl. No.: 18/041,413

(22) PCT Filed: Apr. 19, 2021

(86) PCT No.: PCT/CN2021/088002
§ 371 (c)(1),
(2) Date: Feb. 13, 2023

(87) PCT Pub. No.: WO2021/244161
PCT Pub. Date: Dec. 9, 2021

(65) Prior Publication Data
US 2023/0237683 A1 Jul. 27, 2023

(30) Foreign Application Priority Data
Jun. 4, 2020 (CN) .......................... 202010501846.9

(51) Int. Cl.
G06T 7/55 (2017.01)
G06T 7/80 (2017.01)
(52) U.S. Cl.
CPC .................. G06T 7/55 (2017.01); G06T 7/80 (2017.01); G06T 2207/20084 (2013.01); G06T 2207/20221 (2013.01)

(58) Field of Classification Search
CPC ... G06T 7/55; G06T 7/80; G06T 2207/20084; G06T 2207/20221; G06T 3/60; G06T 5/50; G06T 7/30
See application file for complete search history.

(56) References Cited

U.S. PATENT DOCUMENTS 9,185,288 B2 * 11/2015 Ki .......................... H04N 13/106
9,715,638 B1 7/2017 Chen et al.
10,659,686 B2 * 5/2020 Trevor .................... H04N 23/62

FOREIGN PATENT DOCUMENTS

CN 107545586 A 1/2018
CN 109146001 A 1/2019
(Continued)

OTHER PUBLICATIONS

Internation Search Report of PCT/CN2021/088002,Mailed Jun. 29, 2021.

Primary Examiner — Molly Wilburn
(74) Attorney, Agent, or Firm — True Shepherd LLC; Andrew C. Cheng (57) ABSTRACT

The disclosure provides a model generation method based on a multi-view panoramic image, including: calculating an image rectification rotation matrix of source images and a reference image; extracting a reference image feature of the reference image and source image features of the source images; performing a fusion operation on rectified cost volumes of the plurality of source images corresponding to the reference image to obtain a final cost volume; calculating an estimated phase difference under a set resolution; obtaining a final phase difference of the reference image; and generating a depth map of the reference image, and constructing a corresponding stereo vision model.

15 Claims, 6 Drawing Sheets

(56) References Cited

FOREIGN PATENT DOCUMENTS

| | | | |
|---|---|---|---|
| CN | 110458952 | A | 11/2019 |
| CN | 111127538 | A | 5/2020 |
| CN | 111402345 | A | 7/2020 |
| EP | 3349176 | A1 | 7/2018 |

* cited by examiner

MODEL GENERATION METHOD AND APPARATUS BASED ON MULTI-VIEW PANORAMIC IMAGE

TECHNICAL FIELD

The disclosure relates to the technical field of image processing, in particular to a model generation method and apparatus based on a multi-view panoramic image.

BACKGROUND

Traditional multi-view stereo vision usually performs image sampling in a plurality of pre-adjusted space positions by using a monocular camera. A picture generated at a certain reference viewing angle is set as a reference picture, and all pictures generated at viewing angles coinciding with the viewing angle are source pictures. A traditional multi-view stereo (MVS) reconstruction algorithm usually determines an association among points by searching for matching points, in all the source pictures, of pixel points/feature points in the reference picture, which are usually marked with a phase difference. Based on the association, through a triangular relationship, a depth value of each pixel point in the reference picture can be further worked out. The depth values are fused through a traditional multi-view fusion algorithm, and finally, a stereo vision model in a scenario can be generated.

However, through the above method, an operation of searching for the matching points consumes a lot of computing resources, and if accuracy of the matching points is low, it may lead to poor precision of the subsequent generated stereo vision model.

Therefore, it is necessary to provide a model generation method and apparatus based on a multi-view panoramic image so as to solve the problem in the prior art.

SUMMARY

Embodiments of the disclosure provide a model generation method and a model generation apparatus which are low in consumption of computing resources and high in precision of a generated model, so as to solve the technical problem that an existing model generation method and model generation apparatus are large in consumption of the computing resources and poor in precision of a generated model.

An embodiment of the disclosure provides a model generation method based on a multi-view panoramic image, including:

obtaining a reference image and a plurality of corresponding source images, wherein the source images and the reference image have a coinciding viewing angle;

obtaining source camera parameters of the source images and a reference camera parameter of the reference image, and calculating an image rectification rotation matrix of the source images and the reference image based on the source camera parameters and the reference camera parameter;

extracting a reference image feature of the reference image and source image features of the source images, and calculating cost volumes of the reference image and the source images based on the reference image feature and the source image features;

performing coordinate system transformation on the cost volumes by using the image rectification rotation matrix to obtain rectified cost volumes of the source images and the reference image;

performing a fusion operation on the rectified cost volumes of the plurality of source images corresponding to the reference image to obtain a final cost volume;

calculating a phase difference distribution estimation of the reference image under a set resolution based on the final cost volume, and calculating an estimated phase difference under the set resolution;

fusing an estimated phase difference of the reference image under each layer of resolution to obtain a final phase difference of the reference image; and generating a depth map of the reference image based on the final phase difference of the reference image, and constructing a corresponding stereo vision model according to the depth map.

An embodiment of the disclosure further provides a model generation method based on a multi-view panoramic image, including:

obtaining a reference image and a plurality of corresponding source images, wherein the source images and the reference image have a coinciding viewing angle;

performing a folding dimensionality reduction operation on a first-level reference image to obtain at least one lower-level reference image corresponding to the first-level reference image, and performing a folding dimensionality reduction operation on a first-level source image to obtain at least one lower-level source image corresponding to the first-level source image;

performing feature extraction on the lower-level reference image by using a first preset residual convolutional network so as to obtain a lower-level reference image feature, and performing feature extraction on the lower-level source image by using the first preset residual convolutional network so as to obtain a lower-level source image feature;

obtaining a final cost volume of a lower-level reference image of a corresponding set level based on a lower-level reference image feature of a set level and a source image feature of a set level, and calculating a lower-level reference image phase difference distribution estimation feature of the reference image under a set resolution based on the final cost volume;

obtaining lower-level reference image phase difference distribution estimation features of other levels of the reference image based on lower-level reference image features of other levels and source image features of other levels;

performing feature extraction on the lower-level reference image phase difference distribution estimation features by using a second preset residual convolutional network to obtain discriminative features of the lower-level reference images;

obtaining estimated phase differences of the lower-level reference images based on the discriminative features of the lower-level reference images;

performing a tiling dimensionality raising operation on the discriminative features so as to obtain a rectified discriminative feature of the first-level reference image, and performing a tiling dimensionality raising operation on the estimated phase differences so as to obtain a rectified phase difference of the first-level reference image;

obtaining a final phase difference of the first-level reference image according to the reference image, the source images, the rectified discriminative feature of the first-level reference image and the rectified phase difference of the first-level reference image; and generating a depth map of the reference image based on the final phase difference of the first-level reference image, and constructing a corresponding stereo vision model according to the depth map.

An embodiment of the disclosure further provides a model generation apparatus based on a multi-view panoramic image.

An embodiment of the disclosure further provides a computer readable storage medium, storing processor-executable instructions therein, wherein the instructions are loaded by one or more processors so as to execute any above model generation method based on the multi-view panoramic image.

Compared with a model generation method in the prior art, through the model generation method and the model generation apparatus based on the multi-view panoramic image of the disclosure, by calculating and fusing the cost volumes of the plurality of source images and the reference image, accuracy of the estimated phase difference under the set resolution is improved, so that precision of the generated model is effectively improved; meanwhile, calculating and fusing of the cost volumes are small in consumption of the computing resources, so consumption of the computing resources of a whole model generation flow can be reduced; and the technical problem that the existing model generation method and model generation apparatus are large in consumption of the computing resources and poor in precision of a generated model is effectively solved.

DETAILED DESCRIPTION

Technical solutions in embodiments of the disclosure will be described clearly and completely below with reference to the accompanying drawings in the embodiments of the disclosure. Apparently, the described embodiments are only some, not all of the embodiments of the disclosure. Based on the embodiments in the disclosure, all other embodiments obtained by those skilled in the art without creative work fall within the protection scope of the disclosure.

The model generation method and model generation apparatus based on the multi-view panoramic image of the disclosure are used for an electronic device which generates a corresponding stereo vision model based on a final cost volume of a reference image and source images having a coinciding viewing angle. The electronic device includes but is not limited to a wearable device, a head-mounted device, a medical care platform, a personal computer, a server computer, a hand-held or laptop device, a mobile device (such as a mobile phone, a personal digital assistant (PDA) and a media player), a multiprocessor system, a consumption-type electronic device, a small-size computer, a large-scale computer, a distributed computing environment including any above system or device, and the like.

The electronic device is preferably a model creation terminal or a model creation server for creating a stereo vision model based on the reference image and the source images so as to provide the stereo vision model with a higher precision.

Figure 1:
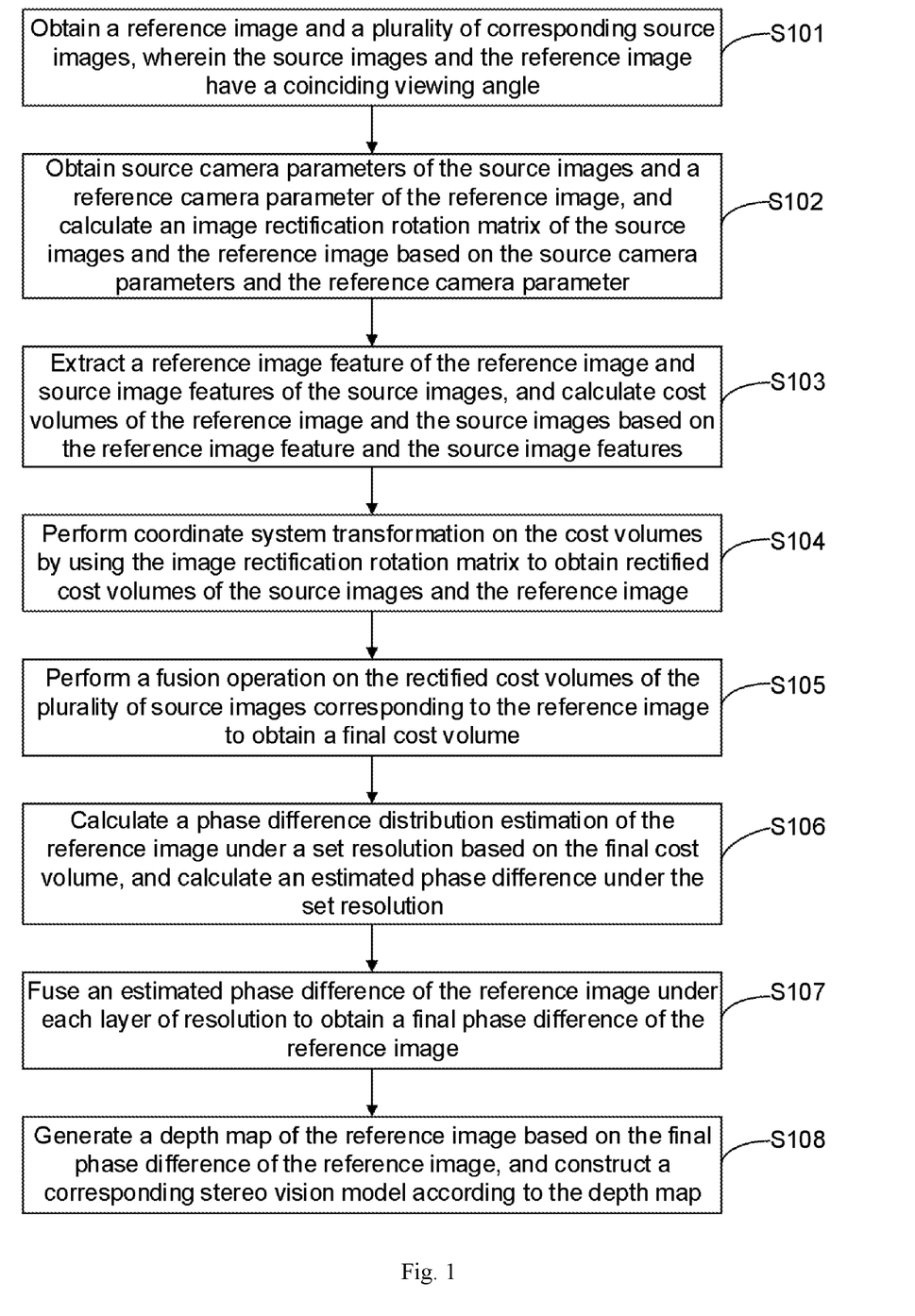
FIG. 1 is a flow chart of a first embodiment of a model generation method based on a multi-view panoramic image of the disclosure.

Please refer to FIG. 1, which is a flow chart of a first embodiment of a model generation method based on a multi-view panoramic image of the disclosure. The model generation method of the present embodiment may be implemented by using the above electronic device. The model generation method based on the multi-view panoramic image of the present embodiment includes:

step S101, a reference image and a plurality of corresponding source images are obtained, wherein the source images and the reference image have a coinciding viewing angle;

step S102, source camera parameters of the source images and a reference camera parameter of the reference image are obtained, and an image rectification rotation matrix of the source images and the reference image is calculated based on the source camera parameters and the reference camera parameter;

step S103, a reference image feature of the reference image and source image features of the source images are extracted, and cost volumes of the reference image and the source images are calculated based on the reference image feature and the source image features;

step S104, coordinate system transformation is performed on the cost volumes by using the image rectification rotation matrix to obtain rectified cost volumes of the source images and the reference image;

step S105, a fusion operation is performed on the rectified cost volumes of the plurality of source images corresponding to the reference image to obtain a final cost volume;

step S106, a phase difference distribution estimation of the reference image under a set resolution is calculated based on the final cost volume, and an estimated phase difference under the set resolution is calculated;

step S107, an estimated phase difference of the reference image under each layer of resolution is fused to obtain a final phase difference of the reference image; and step S108, a depth map of the reference image is generated based on the final phase difference of the reference image, and a corresponding stereo vision model is constructed according to the depth map.

Specific flows of all steps of the model generation method based on the multi-view panoramic image of the present embodiment are described in detail below.

In step S101, a model generation apparatus (such as a model creation server) obtains the reference image and the plurality of corresponding source images, and the source images and the reference image here have a coinciding viewing angle. The reference image is a standard image needing to generate the stereo vision model, the source images are contrast images for generating the stereo vision model, and the reference image and the source images may be images obtained by taking pictures of the same object at different angles.

In step S102, the model generation apparatus needs to calculate a relative position relationship between the reference image and each source image and obtain a corresponding image rectification rotation matrix.

Here, a projection matrix corresponding to the reference image is set to be $P_0=K_0 \cdot [R_0 t_0]$, where $K_0$ is an intrinsic matrix of the reference image, $[R_0 t_0]$ is an extrinsic matrix of the reference image, $R_0$ is a rotation matrix of the reference image, and $t_0$ is a translation vector of the reference image. $P_1, P_2, \ldots P_n$ is a projection matrix of n source images, similarly, $P_n = K_n \cdot [R_n t_n]$. In a world coordinate system, a coordinate of an optical centre of a camera corresponding to the reference image is $c_0 = -R_0' \cdot t_0$, and a coordinate of an optical centre of a camera corresponding to the source images is $c_1 = -R_1' \cdot t_1$.

Therefore, an axis x of an image rectification coordinate system may be set, the axis x is $v_x = (c_1 - c_0) \cdot \text{sign}(R_0(1,:) \cdot R_0' \cdot t_1)$, where $R_0(1,:)$ represents all elements in a first row of a rotation matrix $R_0$, $\text{sign}(R_0(1,:) \cdot R_0' \cdot t_1)$ is used for determining whether $c_1$ is on a right side of $c_0$, that is, whether rightward translation of the source images is implemented relative to the reference image, if $c_1$ is located on the right side of $c_0$, a positive direction of $v_x$ is pointing from a reference image position to a source image position represented by $P_1$, and the operation guarantees that after projection, the source image position moves rightwards relative to the reference image position.

An axis y of the image rectification coordinate system is set, the axis y is $v_y = \text{cross}(R_1(3,:), v_x)$, where a cross function is used for calculating a vector product, a calculated result is also a vector, the vector is perpendicular to two operands of the operation, which are usually vectors as well.

An axis z of the image rectification coordinate system is set and is $v_z = \text{cross}(v_x, v_y)$.

Thus, the image rectification rotation matrix of the source images and the reference image is: $R = [v_x/\|v_x\|_2, v_y/\|v_y\|_2, v_z/\|v_z\|_2]'$, where $\|\cdot\|_2$ is $L_2$ measure.

A relative position relationship between the reference image and the corresponding source images is judged through the projection matrix based on the image rectification rotation matrix, and a rectified reference image is obtained, so a leftward displacement of the rectified reference image exists only in a horizontal direction relative to the source images.

In step S103, the model generation apparatus performs feature extraction on the reference image by using a preset neural network so as to obtain a reference image feature, and meanwhile, performs feature extraction on the source images by using the preset neural network so as to obtain source image features.

Afterwards, the model generation apparatus calculates cost volumes of the reference image and the source images based on the reference image feature and the source image features. The cost volumes represent depth probability values of the reference image in a stereo space. Specifically, the cost volumes of the reference image and the source images may be calculated based on the following formula:

$$C(q,i,j) = F_0(:,i,j) \cdot g(F_1, q)(:,i,j);$$

$$F_0 \in P^{c \times h \times w}$$

where c represents the quantity of feature degree channels of a feature map, h represents a width of the feature map, w represents a height of the feature map, $F_0$ is a feature map of the reference image, $F_1$ is a feature map of the source images, $C(q, i, j)$ is the cost volume of the reference image and the source images, where i is a row position of the cost volume, j is a column position of the cost volume, q is a set phase difference value, and $g(F_1, q)$ represents that the feature map $F_1$ is translated for q pixels in whole in a direction w.

In step S104, the model generation apparatus performs coordinate system transformation on the cost volumes obtained in step S103 by using the image rectification rotation matrix obtained in step S102 to obtain rectified cost volumes (a cost volume at a rectification viewing angle) of the source images and the reference image, so as to fuse the cost volumes of the plurality of different source images and the reference image subsequently.

Specifically, the rectified cost volumes of the source images and the reference image may be calculated through the following formula:

$$C'(m,n,p) = R_0 \cdot R' \cdot C(q,i,j);$$

where $R_0$ is the rotation matrix of the reference image, R is the image rectification rotation matrix of the source images and the reference image, and $C'(m, n, p)$ is the rectified cost volume of the source images and the reference image.

In step S105, the model generation apparatus performs a fusion operation on the rectified cost volumes of the plurality of source images corresponding to the reference image obtained in step S104 to obtain the final cost volume.

Specifically, the model generation apparatus may perform the fusion operation on the rectified cost volumes of the plurality of source images corresponding to the reference image by using an element-wise max-pooling operation to obtain the final cost volume.

The element-wise max-pooling operation is described specifically below, for example, the reference image has corresponding source image A, source image B and source image C, the rectified cost volume of the source image A has elements A1, A2 and A3, the rectified cost volume of the source image B has elements B1, B2 and B3, and the rectified cost volume of the source image C has elements C1, C2 and C3.

If A1 is the largest among A1, B1 and C1, B2 is the largest among A2, B2 and C2, and C3 is the largest among A3, B3 and C3, the final cost volume after fusion has elements A1, B2 and C3.

In step S106, the model generation apparatus calculates the phase difference distribution estimation of the reference image under the set resolution based on the final cost volume obtained in step S105, and calculates the estimated phase difference under the set resolution.

Specifically, the model generation apparatus calculates the phase difference distribution estimation of the reference image under the set resolution based on the final cost volume by using the preset neural network. In other words, under the set resolution, the final cost volume may correspond to the phase difference distribution estimation through calculating of the preset neural network, and thus the estimated phase difference under the resolution may be calculated through the phase difference distribution estimation. The preset neural network may be obtained through model training of positive and negative samples.

Under the set resolution, a size of a detected object in the reference image is 0.3% to 10% of a size of the reference image. If the size of the detected object is greater than 10% of the size of the reference image, detection for motion of the detected object may be insensitive. If the size of the detected object is smaller than 0.3% of the size of the reference image, motion of the corresponding detected object may be not detected. In a case of a smaller resolution, the reference image focuses more on a more detailed motion of the detected object, and in a case of a larger resolution, the reference image focuses more on a more macroscopic motion of the detected object.

In the reference image, the size of the detected object for a high human eye sensitivity and high human eye observation comfort is 0.3% to 10% of the size of the whole image, so a traditional stereo vision model may adopt more computing resources to perform calculating of matching points under the resolution, however, in the present embodiment, calculating of the estimated phase difference is performed for the reference image and the plurality of corresponding source images under the resolution by using the final cost volume, and calculating cost of matching points of the reference image and the source images under the resolution can be greatly reduced.

In step S107, as a final phase difference of the reference image is synthesized by estimated phase differences of the reference image under various resolutions, under different resolutions, sizes of the detected object that a user focuses on in the reference image are different. Therefore, the model generation apparatus fuses the estimated phase difference of the reference image under each layer of resolution so as to obtain the final phase difference of the reference image.

In step S108, the model generation apparatus generates the depth map of the reference image based on the final phase difference obtained in step S107, and constructs the corresponding stereo vision model according to the depth map.

Specifically, the model generation apparatus may generate the depth map of the reference image through the following formula:

$$z = \frac{f \cdot b}{d},$$

where f is a focal length of the camera corresponding to the reference image, b is a base line length in a multi-view panoramic image stereo system, and d is the estimated phase difference.

Through the above formula, the final phase difference may be transformed into the depth map, then a multi-view depth map is subjected to mutual inspection to remove outliers so as to be used for generating 3D point cloud, and finally, the corresponding stereo vision model is generated.

Accordingly, a generation process of the stereo vision model by the model generation method based on the multi-view panoramic image of the present embodiment is completed.

Through the model generation method based on the multi-view panoramic image of the present embodiment, the cost volumes of the plurality of source images and the reference image are calculated and fused, accuracy of the estimated phase difference under the set resolution is improved, so that precision of the generated model is effectively improved, and meanwhile, calculating and fusion of the cost volumes are small in consumption of the computing resources, so consumption of the computing resources of the whole model generation flow can be reduced.

Figure 2:
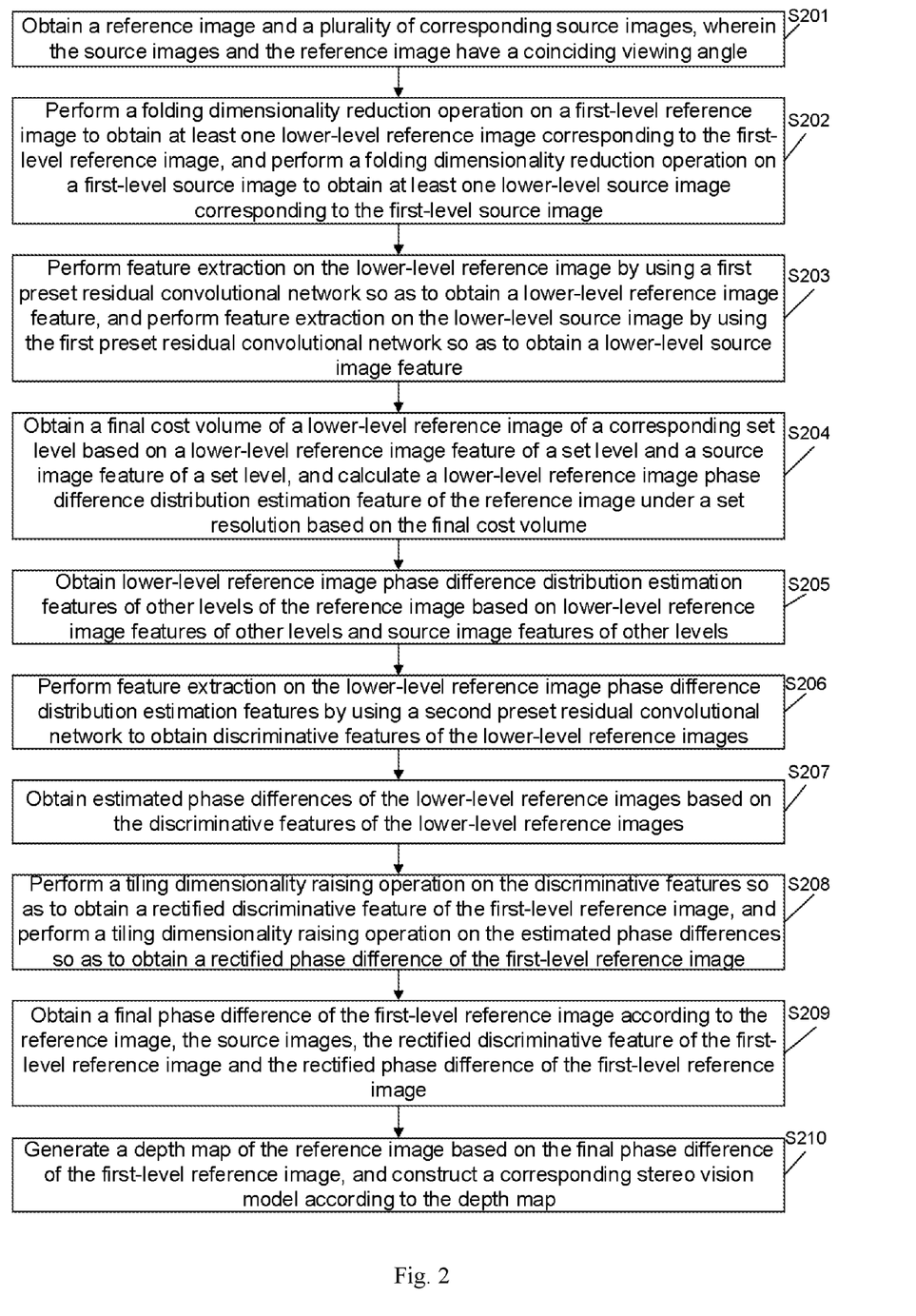
FIG. 2 is a flow chart of a second embodiment of a model generation method based on a multi-view panoramic image of the disclosure.

Please refer to FIG. 2, which is a flow chart of a second embodiment of a model generation method based on a multi-view panoramic image of the disclosure. The model generation method of the present embodiment may be implemented by using the above electronic device. The model generation method based on the multi-view panoramic image of the present embodiment includes:

step S201, a reference image and a plurality of corresponding source images are obtained, wherein the source images and the reference image have a coinciding viewing angle;

step S202, a folding dimensionality reduction operation is performed on a first-level reference image to obtain at least one lower-level reference image corresponding to the first-level reference image, and a folding dimensionality reduction operation is performed on a first-level source image to obtain at least one lower-level source image corresponding to the first-level source image;

step S203, feature extraction is performed on the lower-level reference image by using a first preset residual convolutional network so as to obtain a lower-level reference image feature, and feature extraction is performed on the lower-level source image by using the first preset residual convolutional network so as to obtain a lower-level source image feature;

step S204, a final cost volume of a lower-level reference image of a corresponding set level is obtained based on a lower-level reference image feature of a set level and a source image feature of a set level, and a lower-level reference image phase difference distribution estimation feature of the reference image under a set resolution is calculated based on the final cost volume;

step S205, lower-level reference image phase difference distribution estimation features of other levels of the reference image are obtained based on lower-level reference image features of other levels and source image features of other levels;

step S206, feature extraction is performed on the lower-level reference image phase difference distribution estimation features by using a second preset residual convolutional network to obtain discriminative features of the lower-level reference images;

step S207, estimated phase differences of the lower-level reference images are obtained based on the discriminative features of the lower-level reference images;

step S208, a tiling dimensionality raising operation is performed on the discriminative features so as to obtain a rectified discriminative feature of the first-level reference image, and a tiling dimensionality raising operation is performed on the estimated phase differences so as to obtain a rectified phase difference of the first-level reference image;

step S209, a final phase difference of the first-level reference image is obtained according to the reference image, the source images, the rectified discriminative feature of the first-level reference image and the rectified phase difference of the first-level reference image; and step S210, a depth map of the reference image is generated based on the final phase difference of the first-level reference image, and a corresponding stereo vision model is constructed according to the depth map.

Specific flows of all steps of the model generation method based on the multi-view panoramic image of the present embodiment are described in detail below.

In step S201, a model generation apparatus obtains the reference image and the plurality of corresponding source images shot by a multi-view camera, wherein the source images and the reference image have the coinciding viewing angle.

In step S202, the model generation apparatus performs the folding dimensionality reduction operation on the first-level reference image to obtain a plurality of lower-level reference images corresponding to the first-level reference image, such as four second-level reference images, and if the folding dimensionality reduction operation continues to be performed on the second-level reference images, four third-level reference images may be obtained.

Figure 3:
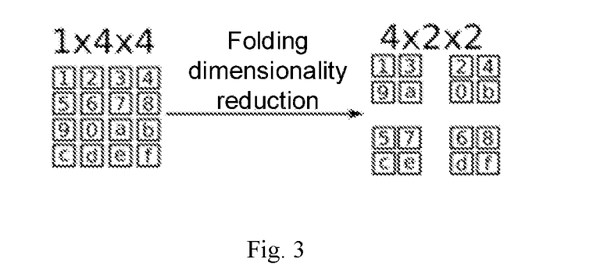
FIG. 3 is a schematic diagram of an operation of performing folding dimensionality reduction on a first-level reference image to form four second-level reference images.

Specifically, please refer to FIG. 3, which is a schematic diagram of an operation of performing folding dimensionality reduction on the first-level reference image to form four second-level reference images. A resolution of the first-level reference image is 4*4, and a resolution of the second-level reference images is 2*2.

In the meantime, the model generation apparatus further performs the folding dimensionality reduction operation on the first-level source image to obtain a plurality of lower-level source images corresponding to the first-level source image, such as four second-level source images, and if the folding dimensionality reduction operation continues to be performed on the second-level source images, four third-level source images may be obtained.

Setting of the reference image in different levels or resolutions may better meet a demand of receptive fields of different scenario objects in scenarios.

In step S203, the model generation apparatus performs feature extraction on the plurality of lower-level reference images (such as the second-level reference images and the third-level reference images) obtained in step S202 by using the first preset residual convolutional network so as to obtain a plurality of lower-level reference image features of different levels.

In the meantime, the model generation apparatus performs feature extraction on the plurality of lower-level source images obtained in step S202 by using the first preset residual convolutional network so as to obtain a plurality of lower-level source image features of different levels.

In step S204, the model generation apparatus obtains the final cost volume of the lower-level reference image of the corresponding set level based on the lower-level reference image feature of the set level and the source image feature of the set level. Specifically, a calculating process of the final cost volume may refer to steps S101 to S105 of the first embodiment of the model generation method based on the multi-view panoramic image.

Afterwards, the model generation apparatus calculates image phase difference distribution estimation features of the lower-level reference images of the reference image under the set resolution based on the final cost volume.

Specifically, the model generation apparatus may calculate image phase difference distribution estimation features of the lower-level reference images of the reference image under the set resolution by using a preset neural network. In other words, under the set resolution, the final cost volume may correspond to the phase difference distribution estimation through calculating of the preset neural network, and thus the estimated phase difference under the resolution may be calculated through the phase difference estimation. The preset neural network may be obtained through model training of positive and negative samples.

In the reference image, the size of the detected object for a high human eye sensitivity and high human eye observation comfort is 0.3% to 10% of the size of the whole image, so a traditional stereo vision model may adopt more computing resources to perform calculating of matching points under the resolution, however, in the present embodiment, calculating of the estimated phase difference is performed for the reference image and the plurality of corresponding source images under the resolution by using the final cost volume, and calculating cost of matching points of the reference image and the source images under the resolution can be greatly reduced.

In step S205, the model generation apparatus obtains the lower-level reference image phase difference distribution estimation features of the other levels of the reference image based on the lower-level reference image features of the other levels and the source image features of the other levels. As the consumption of the computing resources is low under the other resolutions, an existing feature point matching algorithm may be adopted here for calculating the lower-level reference image phase difference distribution estimation features of the other levels of the reference image.

In step S206, the model generation apparatus performs feature extraction on the lower-level reference image phase difference distribution estimation features obtained in step S204 and step S205 by using the second preset residual convolutional network so as to obtain the discriminative features of the lower-level reference images.

In step S207, the model generation apparatus obtains the estimated phase differences of the lower-level reference images based on the obtained discriminative features of the lower-level reference images. In other words, the estimated phase differences of the corresponding lower-level reference images are determined based on a preset estimated phase difference corresponding to the discriminative features of the lower-level reference images. If the preset estimated phase difference corresponding to the discriminative features of the lower-level reference images is large, the correspondingly obtained estimated phase differences of the lower-level reference images are also large, and if the preset estimated phase difference corresponding to the discriminative features of the lower-level reference images is small, the correspondingly obtained estimated phase differences of the lower-level reference images are also small. The preset estimated phase difference may be obtained through model training of the positive and negative samples.

In step S208, the model generation apparatus performs the tiling dimensionality raising operation on the discriminative features of the lower-level reference images obtained in step S206 so as to obtain the rectified discriminative feature of the first-level reference image; and the model generation apparatus performs the tiling dimensionality raising on the estimated phase differences of the lower-level reference images obtained in step S207 so as to obtain a rectified phase difference of the first-level reference image.

For example, the model generation apparatus may perform the tiling dimensionality raising operation on discriminative features of the third-level reference images so as to obtain a rectified discriminative feature of the second-level reference image, the rectified discriminative feature of the second-level reference image may be used for calculating a discriminative feature of the second-level reference image, and then the model generation apparatus may perform the tiling dimensionality raising operation on the discriminative feature of the second-level reference image so as to obtain the rectified discriminative feature of the first-level reference image.

Figure 4:
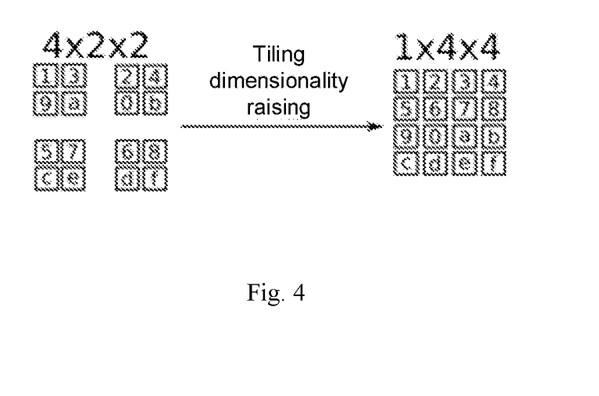
FIG. 4 is a schematic diagram of an operation of performing tiling dimensionality raising on four third-level reference images to form a second-level reference image.

Specifically, please refer to FIG. 4, which is a schematic diagram of an operation of performing tiling dimensionality raising on four third-level reference images to form a second-level reference image. A resolution of corresponding images of the discriminative features of the third-level reference images is 2*2, and a resolution of corresponding images of the rectified discriminative features of the second-level reference images is 4*4.

Likewise, the model generation apparatus may perform the tiling dimensionality raising operation on estimated phase differences of the third-level reference images so as to obtain rectified phase differences of the second-level reference images, the rectified phase differences of the second-level reference images may be used for calculating estimated phase differences of the second-level reference images, and then the model generation apparatus performs the tiling dimensionality raising operation on the estimated phase differences of the second-level reference images so as to obtain the rectified phase difference of the first-level reference image.

In step S209, the model generation apparatus performs feature fusion on the reference image and the source images obtained in step S201 as well as the rectified discriminative feature of the first-level reference image and the rectified phase difference of the first-level reference image obtained in step S208, and obtains the corresponding final phase difference of the first-level reference image according to a fused feature. A corresponding relationship between the fused feature and the final phase difference of the first-level reference image may be obtained through model training of the positive and negative samples.

In step S210, the model generation apparatus generates the depth map of the reference image based on the final phase difference obtained in step S209 and constructs the corresponding stereo vision model according to the depth map.

The final phase difference may be transformed into the depth map, afterwards, a multi-view depth map is subjected to mutual inspection to remove outliers so as to be used for generating 3D point cloud, and finally, the corresponding stereo vision model is generated.

Accordingly, a generation process of the stereo vision model by the model generation method based on the multi-view panoramic image of the present embodiment is completed.

On the basis of the first embodiment, through the model generation method based on the multi-view panoramic image of the present embodiment, under the set resolution, the final cost volume is used for calculating the lower-level reference image phase difference distribution estimation features, image features are directly used for calculating the lower-level reference image phase difference distribution estimation features under other resolutions, so on the basis of simplifying a whole model generation flow, the precision of the generated model is further improved, and consumption of the computing resources of the model generation flow is reduced.

The disclosure further provides a model generation apparatus based on a multi-view panoramic image. Please refer to FIG. 5, which is a schematic structural diagram of a first embodiment of a model generation apparatus based on a multi-view panoramic image of the disclosure. The model generation apparatus of the present embodiment may be implemented by using the first embodiment of the above model generation method. The model generation apparatus 50 of the present embodiment includes an image obtaining module 51, an image rectification rotation matrix calculating module 52, a cost volume calculating module 53, a cost volume transformation module 54, a cost volume fusion module 55, a set estimated phase difference calculating module 56, a phase difference fusion module 57 and a model constructing module 58.

Figure 5:
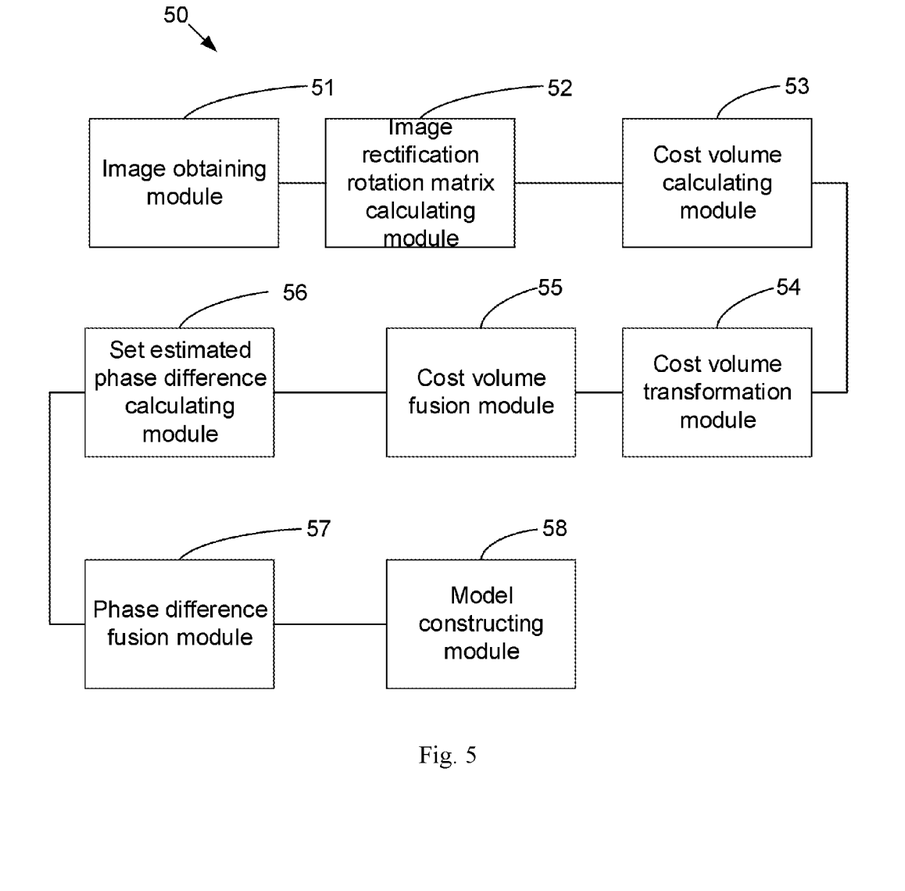
FIG. 5 is a schematic structural diagram of a first embodiment of a model generation apparatus based on a multi-view panoramic image of the disclosure.

The image obtaining module 51 is configured to obtain a reference image and a plurality of corresponding source images, wherein the source images and the reference image have a coinciding viewing angle. The image rectification rotation matrix calculating module 52 is configured to obtain source camera parameters of the source images and a reference camera parameter of the reference image, and calculate an image rectification rotation matrix of the source images and the reference image based on the source camera parameters and the reference camera parameter. The cost volume calculating module 53 is configured to extract a reference image feature of the reference image and source image features of the source images, and calculate cost volumes of the reference image and the source images based on the reference image feature and the source image features. The cost volume transformation module 54 is configured to perform coordinate system transformation on the cost volumes by using the image rectification rotation matrix to obtain rectified cost volumes of the source images and the reference image. The cost volume fusion module 55 is configured to perform a fusion operation on the rectified cost volumes of the plurality of source images corresponding to the reference image to obtain a final cost volume. The set estimated phase difference calculating module 56 is configured to calculate a phase difference distribution estimation of the reference image under a set resolution based on the final cost volume, and calculate an estimated phase difference under the set resolution. The phase difference fusion module 57 is configured to fuse an estimated phase difference of the reference image under each layer of resolution to obtain a final phase difference of the reference image. The model constructing module 58 is configured to generate a depth map of the reference image based on the final phase difference of the reference image, and construct a corresponding stereo vision model according to the depth map.

During use of the model generation apparatus 50 based on the multi-view panoramic image of the present embodiment, first, the image obtaining module 51 obtains the reference image and the plurality of corresponding source images. The source images and the reference image here have the coinciding viewing angle. The reference image is a standard image needing to generate the stereo vision model, the source images are contrast images for generating the stereo vision model, and the reference image and the source images may be images obtained by taking pictures of the same object at different angles.

Afterwards, the image rectification rotation matrix calculating module 52 needs to calculate a relative position relationship between the reference image and each source image and obtain a corresponding image rectification rotation matrix.

A relative position relationship between the reference image and the corresponding source images is judged through a projection matrix based on the image rectification rotation matrix, and a rectified reference image is obtained, so a leftward displacement of the rectified reference image exists only in a horizontal direction relative to the source images.

Then, the cost volume calculating module 53 performs feature extraction on the reference image by using the preset neural network so as to obtain the reference image feature, and meanwhile, performs feature extraction on the source images by using the preset neural network to obtain the source image features.

Then, the cost volume calculating module 53 calculates the cost volumes of the reference image and the source images based on the reference image feature and the source image features. The cost volumes represent depth probability values of the reference image in a stereo space. Specifically, the cost volumes of the reference image and the source images may be calculated based on the following formula:

$$C(q,i,j)=F_0(:,i,j)'\cdot g(F_1,q)(:,i,j);$$

$$F_0 \in P^{c \times h \times w};$$

where c represents the quantity of feature degree channels of a feature map, h represents a width of the feature map, w represents a height of the feature map, $F_0$ is a feature map of the reference image, $F_1$ is a feature map of the source images, C(q, i, j) is the cost volume of the reference image and the source images, where i is a row position of the cost volume, j is a column position of the cost volume, q is a set phase difference value, and $g(F_1, q)$ represents that the feature map $F_1$ is translated for q pixels in whole in a direction w.

Then, the cost volume transformation module 55 performs coordinate system transformation on the cost volumes by using the image rectification rotation matrix to obtain rectified cost volumes (a cost volume at a rectification viewing angle) of the source images and the reference image so as to fuse the cost volumes of the plurality of different source images and the reference image subsequently.

Specifically, the rectified cost volumes of the source images and the reference image may be calculated through the following formula:

$$C'(m,n,p)=R_0\cdot R'\cdot C(q,i,j);$$

where $R_0$ is a rotation matrix of the reference image, R is the image rectification rotation matrix of the source images and the reference image, and C'(m, n, p) is the rectified cost volume of the source images and the reference image.

Then, the cost volume fusion module 55 performs the fusion operation on the obtained rectified cost volumes of the plurality of source images corresponding to the reference image to obtain the final cost volume.

Specifically, the cost volume fusion module 55 may perform the fusion operation on the rectified cost volumes of the plurality of source images corresponding to the reference image by using an element-wise max-pooling operation to obtain the final cost volume.

Afterwards, the set estimated phase difference calculating module 56 calculates the phase difference distribution estimation of the reference image under the set resolution based on the obtained final cost volume and calculates the estimated phase difference under the set resolution.

Specifically, the set estimated phase difference calculating module 56 calculates the phase difference distribution estimation of the reference image under the set resolution based on the final cost volume by using a preset neural network. In other words, under the set resolution, the final cost volume may correspond to the phase difference distribution estimation through calculating of the preset neural network, and thus the estimated phase difference under the resolution may be calculated through the phase difference distribution estimation. The preset neural network may be obtained through model training of positive and negative samples.

Under the set resolution, a size of a detected object in the reference image is 0.3% to 10% of a size of the reference image. If the size of the detected object is greater than 10% of the size of the reference image, detection for motion of the detected object may be insensitive. If the size of the detected object is smaller than 0.3% of the size of the reference image, motion of the corresponding detected object may be not detected. In a case of a smaller resolution, the reference image focuses more on a more detailed motion of the detected object, and in a case of a larger resolution, the reference image focuses more on a more macroscopic motion of the detected object.

In the reference image, the size of the detected object for a high human eye sensitivity and high human eye observation comfort is 0.3% to 10% of the size of the whole image, so a traditional stereo vision model may adopt more computing resources to perform calculating of matching points under the resolution, however, in the present embodiment, calculating of the estimated phase difference is performed for the reference image and the plurality of corresponding source images under the resolution by using the final cost volume, and calculating cost of matching points of the reference image and the source images under the resolution can be greatly reduced.

As a final phase difference of the reference image is synthesized by estimated phase differences of the reference image under various resolutions, under different resolutions, sizes of the detected object that a user focuses on in the reference image are different. Therefore, the phase difference fusion module 57 fuses the estimated phase difference of the reference image under each layer of resolution so as to obtain the final phase difference of the reference image.

Finally, the model constructing module 58 generates the depth map of the reference image based on the final phase difference, and constructs the corresponding stereo vision model according to the depth map.

Specifically, the model constructing module 58 may generate the depth map of the reference image through the following formula:

$$z = \frac{f \cdot b}{d};$$

where f is a focal length of a camera corresponding to the reference image, b is a base line length in a multi-view panoramic image stereo system, and d is the estimated phase difference.

Through the above formula, the final phase difference may be transformed into the depth map, then a multi-view depth map is subjected to mutual inspection to remove outliers so as to be used for generating 3D point cloud, and finally, the corresponding stereo vision model is generated.

Accordingly, a generation process of the stereo vision model by the model generation apparatus 50 based on the multi-view panoramic image of the present embodiment is completed.

Through the model generation apparatus based on the multi-view panoramic image of the present embodiment, the cost volumes of the plurality of source images and the reference image are calculated and fused, accuracy of the estimated phase difference under the set resolution is improved, so that precision of the generated model is effectively improved, and meanwhile, calculating and fusion of the cost volumes are small in consumption of the computing resources, so consumption of the computing resources of the whole model generation flow can be reduced.

Figure 6:
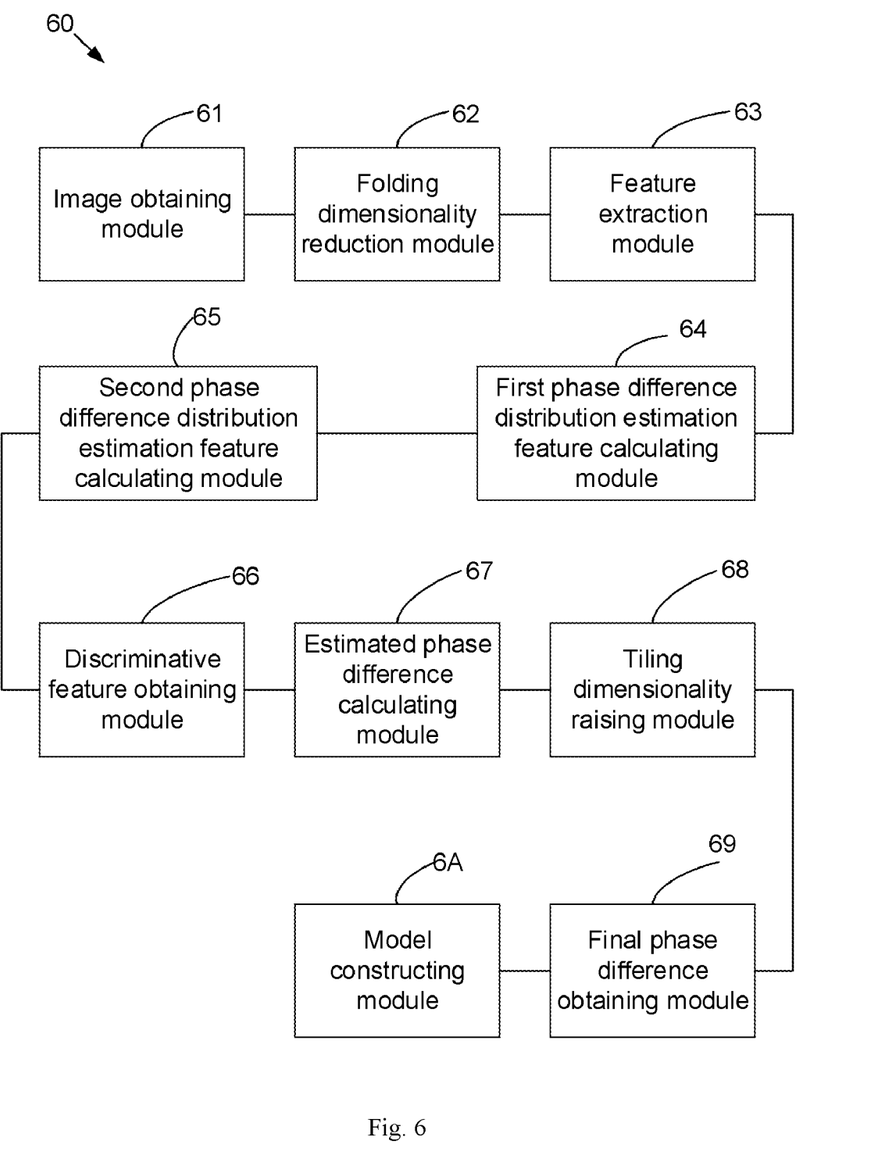
FIG. 6 is a schematic structural diagram of a second embodiment of a model generation apparatus based on a multi-view panoramic image of the disclosure.

Please refer to FIG. 6, which is a schematic structural diagram of a second embodiment of a model generation apparatus based on a multi-view panoramic image of the disclosure. The model generation apparatus of the present embodiment may be implemented by using the second embodiment of the above model generation method. The model generation apparatus 60 of the present embodiment includes an image obtaining module 61, a folding dimensionality reduction module 62, a feature extraction module 63, a first phase difference distribution estimation feature calculating module 64, a second phase difference distribution estimation feature calculating module 65, a discriminative feature obtaining module 66, an estimated phase difference calculating module 67, a tiling dimensionality raising module 68, a final phase difference obtaining module 69 and a model constructing module 6A.

The image obtaining module 61 is configured to obtain a reference image and a plurality of corresponding source images, wherein the source images and the reference image have a coinciding viewing angle. The folding dimensionality reduction module 62 is configured to perform a folding dimensionality reduction operation on a first-level reference image to obtain at least one lower-level reference image corresponding to the first-level reference image, and perform a folding dimensionality reduction operation on a first-level source image to obtain at least one lower-level source image corresponding to the first-level source image. The feature extraction module 63 is configured to perform feature extraction on the lower-level reference image by using a first preset residual convolutional network so as to obtain a lower-level reference image feature, and perform feature extraction on the lower-level source image by using the first preset residual convolutional network so as to obtain a lower-level source image feature. The first phase difference distribution estimation feature calculating module 64 is configured to obtain a final cost volume of a lower-level reference image of a corresponding set level based on a lower-level reference image feature of a set level and a source image feature of a set level, and calculate a lower-level reference image phase difference distribution estimation feature of the reference image under a set resolution based on the final cost volume. The second phase difference distribution estimation feature calculating module 65 is configured to obtain lower-level reference image phase difference distribution estimation features of other levels of the reference image based on lower-level reference image features of other levels and source image features of other levels. The discriminative feature obtaining module 66 is configured to perform feature extraction on the lower-level reference image phase difference distribution estimation features by using a second preset residual convolutional network to obtain discriminative features of the lower-level reference images. The estimated phase difference calculating module 67 is configured to obtain estimated phase differences of the lower-level reference images based on the discriminative features of the lower-level reference images. The tiling dimensionality raising module 68 is configured to perform a tiling dimensionality raising operation on the discriminative features so as to obtain a rectified discriminative feature of the first-level reference image, and perform a tiling dimensionality raising operation on the estimated phase differences so as to obtain a rectified phase difference of the first-level reference image. The final phase difference obtaining module 69 is configured to obtain a final phase difference of the first-level reference image according to the reference image, the source images, the rectified discriminative feature of the first-level reference image and the rectified phase difference of the first-level reference image. The model constructing module 6A is configured to generate a depth map of the reference image based on the final phase difference of the first-level reference image, and construct a corresponding stereo vision model according to the depth map.

During use of the model generation apparatus 60 based on the multi-view panoramic image of the present embodiment, first, the image obtaining module 61 obtains the reference image and the plurality of corresponding source images shot by a multi-view camera, wherein the source images and the reference image have the coinciding viewing angle.

Then, the folding dimensionality reduction module 62 performs the folding dimensionality reduction operation on the first-level reference image to obtain the plurality of lower-level reference images corresponding to the first-level reference image, such as four second-level reference images, and if the folding dimensionality reduction operation continues to be performed on the second-level reference images, four third-level reference images may be obtained.

In the meantime, the folding dimensionality reduction module 62 further performs the folding dimensionality reduction operation on the first-level source image to obtain a plurality of lower-level source images corresponding to the first-level source image, such as four second-level source images, and if the folding dimensionality reduction operation continues to be performed on the second-level source images, four third-level source images may be obtained.

Setting of the reference image in different levels or resolutions may better meet a demand of receptive fields of different scenario objects in scenarios.

Then, the feature extraction module 63 performs feature extraction on the plurality of lower-level reference images (such as the second-level reference images and the third-level reference images) by using the first preset residual convolutional network so as to obtain a plurality of lower-level reference image features of different levels.

In the meantime, the feature extraction module 63 performs feature extraction on the plurality of lower-level source images by using the first preset residual convolutional network so as to obtain the plurality of lower-level source image features of different levels.

Afterwards, the first phase difference distribution estimation feature calculating module 64 obtains the final cost volume of the lower-level reference image of the corresponding set level based on the lower-level reference image feature of the set level and the source image feature of the set level.

Then, the first phase difference distribution estimation feature calculating module 64 calculates the image phase difference distribution estimation features of the lower-level reference image of the reference image under the set resolution based on the final cost volume.

Specifically, the first phase difference distribution estimation feature calculating module 64 may calculate the image phase difference distribution estimation features of the lower-level reference image of the reference image under the set resolution by using a preset neural network. In other words, under the set resolution, the final cost volume may correspond to the phase difference distribution estimation through calculating of the preset neural network, and thus the estimated phase difference under the resolution may be calculated through the phase difference estimation. The preset neural network may be obtained through model training of positive and negative samples.

Afterwards, the second phase difference distribution estimation feature calculating module 65 obtains the lower-level reference image phase difference distribution estimation features of the other levels of the reference image based on the lower-level reference image features of the other levels and the source image features of the other levels. As the consumption of the computing resources is low under the other resolutions, an existing feature point matching algorithm may be adopted here for calculating the lower-level reference image phase difference distribution estimation features of the other levels of the reference image.

Afterwards, the discriminative feature obtaining module 66 performs feature extraction on the lower-level reference image phase difference distribution estimation features by using the second preset residual convolutional network so as to obtain the discriminative features of the lower-level reference images.

Then, the estimated phase difference calculating module 67 obtains the estimated phase differences of the lower-level reference images based on the obtained discriminative features of the lower-level reference images. In other words, the estimated phase differences of the corresponding lower-level reference images are determined based on a preset estimated phase difference corresponding to the discriminative features of the lower-level reference images. If the preset estimated phase difference corresponding to the discriminative features of the lower-level reference images is large, the correspondingly obtained estimated phase differences of the lower-level reference images are also large, and if the preset estimated phase difference corresponding to the discriminative features of the lower-level reference images is small, the correspondingly obtained estimated phase differences of the lower-level reference images are also small. The preset estimated phase difference may be obtained through model training of the positive and negative samples.

Afterwards, the tiling dimensionality raising module 68 performs the tiling dimensionality raising operation on the discriminative features of the lower-level reference images so as to obtain the rectified discriminative feature of the first-level reference image; and the tiling dimensionality raising module performs the tiling dimensionality raising on the estimated phase differences of the lower-level reference images so as to obtain a rectified phase difference of the first-level reference image.

For example, the tiling dimensionality raising module 68 may perform the tiling dimensionality raising operation on discriminative features of the third-level reference images so as to obtain a rectified discriminative feature of the second-level reference image, the rectified discriminative feature of the second-level reference image may be used for calculating a discriminative feature of the second-level reference image, and then the tiling dimensionality raising module may perform the tiling dimensionality raising operation on the discriminative feature of the second-level reference image so as to obtain the rectified discriminative feature of the first-level reference image.

Likewise, the tiling dimensionality raising module 68 may perform the tiling dimensionality raising operation on estimated phase differences of the third-level reference images so as to obtain rectified phase differences of the second-level reference images, the rectified phase differences of the second-level reference images may be used for calculating estimated phase differences of the second-level reference images, and then the tiling dimensionality raising module performs the tiling dimensionality raising operation on the estimated phase differences of the second-level reference images so as to obtain the rectified phase difference of the first-level reference image.

Then, the final phase difference obtaining module 69 performs feature fusion on the reference image and the source images as well as the rectified discriminative feature of the first-level reference image and the rectified phase difference of the first-level reference image, and obtains the corresponding final phase difference of the first-level reference image according to a fused feature. A corresponding relationship between the fused feature and the final phase difference of the first-level reference image may be obtained through model training of the positive and negative samples.

Finally, the model constructing module 6A generates the depth map of the reference image based on the final phase difference and constructs the corresponding stereo vision model according to the depth map.

The final phase difference may be transformed into the depth map, afterwards, a multi-view depth map is subjected to mutual inspection to remove outliers so as to be used for generating 3D point cloud, and finally, the corresponding stereo vision model is generated.

Accordingly, a generation process of the stereo vision model by the model generation apparatus based on the multi-view panoramic image of the present embodiment is completed.

On the basis of the first embodiment, through the model generation apparatus based on the multi-view panoramic image of the present embodiment, under the set resolution, the final cost volume is used for calculating the lower-level reference image phase difference distribution estimation features, image features are directly used for calculating the lower-level reference image phase difference distribution estimation features under other resolutions, so on the basis of simplifying a whole model generation flow, the precision of the generated model is further improved, and consumption of the computing resources of the model generation flow is reduced.

Figure 7:
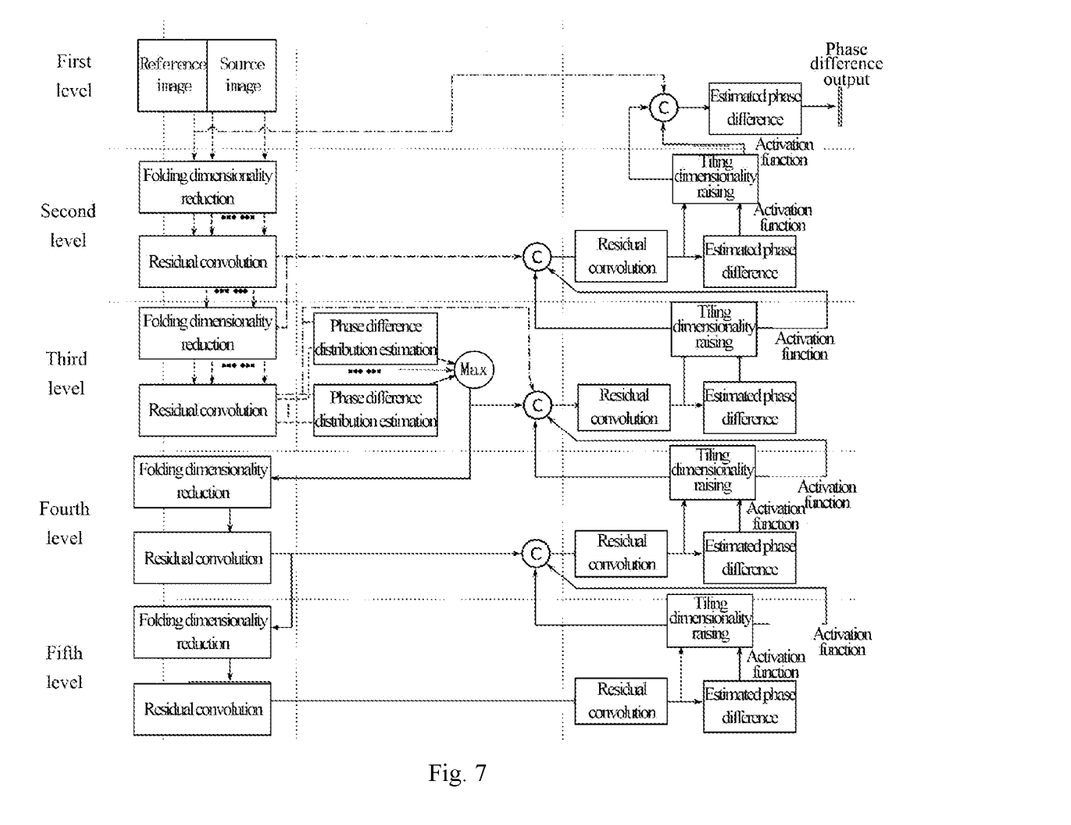
FIG. 7 is a schematic flow chart of a specific embodiment of a model generation method and model generation apparatus based on a multi-view panoramic image of the disclosure.

Please refer to FIG. 7, which is a schematic flow chart of a specific embodiment of a model generation method and model generation apparatus based on a multi-view panoramic image of the disclosure. Through the model generation method and generation apparatus of the specific embodiment, repeated folding dimensionality reduction is performed on the first-level reference image and the corresponding first-level source image, so as to generate a feature map under multiple resolutions. The number of resolution levels may be adjusted according to a size of an actual reference image, so that it is guaranteed that a minimum resolution phase difference estimation may include a maximum phase difference of the reference image and the source images. Under each resolution, according to a phase difference distribution generated by a feature map of a left eye and right eye image and a feature map of the image under the resolution, an actual numerical value of the phase difference is predicted. Moreover, as for a resolution level of a high human eye sensitivity, calculating of the estimated phase difference is performed by using the final cost volume of the reference image and the plurality of corresponding source images, so calculating cost of matching points of the reference image and the source images under the resolution is greatly reduced.

The above phase difference obtained by prediction and the feature map used for generation a prediction may be transmitted to a higher-level reference image through the tiling dimensionality raising operation for fusion processing, a dense phase difference map of an original resolution is generated through repeated tiling dimensionality raising operations, and thus the corresponding depth map and the corresponding stereo vision model are further generated based on the phase difference map.

Through the model generation method and the model generation apparatus based on the multi-view panoramic image of the disclosure, by calculating and fusing the cost volumes of the plurality of source images and the reference image, accuracy of the estimated phase difference under the set resolution is improved, so that precision of the generated model is effectively improved; meanwhile, calculating and fusing of the cost volumes are small in consumption of the computing resources, so consumption of the computing resources of the whole model generation flow can be reduced; and the technical problem that an existing model generation method and model generation apparatus are large in consumption of the computing resources and poor in precision of a generated model is effectively solved.

To sum up, though the disclosure has been already disclosed above by using the embodiments, sequence numbers before the embodiments are only used for convenient description and do not form a limitation to the sequence of all the embodiments of the disclosure. Besides, the above embodiments are not used for limiting the disclosure, those ordinarily skilled in the art can make various changes and polishing without departing from the spirit and the scope of the disclosure, so the protection scope of the disclosure is subject to the scope defined by claims.

What is claimed is:

1. A model generation method based on a multi-view panoramic image, comprising:

obtaining a reference image and a plurality of corresponding source images, wherein the source images and the reference image have a coinciding viewing angle;

obtaining source camera parameters of the source images and a reference camera parameter of the reference image, and calculating an image rectification rotation matrix of the source images and the reference image based on the source camera parameters and the reference camera parameter;

extracting a reference image feature of the reference image and source image features of the source images, and calculating cost volumes of the reference image and the source images based on the reference image feature and the source image features;

performing coordinate system transformation on the cost volumes by using the image rectification rotation matrix to obtain rectified cost volumes of the source images and the reference image;

performing a fusion operation on the rectified cost volumes of the plurality of source images corresponding to the reference image to obtain a final cost volume;

calculating a phase difference distribution estimation of the reference image under a set resolution based on the final cost volume, and calculating an estimated phase difference under the set resolution;

fusing an estimated phase difference of the reference image under each layer of resolution to obtain a final phase difference of the reference image; and generating a depth map of the reference image based on the final phase difference of the reference image, and constructing a corresponding stereo vision model according to the depth map.

2. The model generation method according to claim 1, wherein the image rectification rotation matrix of the source images and the reference image is calculated based on the following formula:

$$v_x = (c_1 - c_0) \cdot \text{sign}(R_0(1,:) \cdot R_0' \cdot t_1);$$

$$v_y = \text{cross}(R_1(3,:), v_x);$$

$$v_z = \text{cross}(v_x, v_y);$$

$$R = [v_x / \|v_x\|_2, v_y / \|v_y\|_2, v_z / \|v_z\|_2]';$$

$$c_0 = -R_0' \cdot t_0;$$

$$c_1 = -R_1' \cdot t_1;$$

wherein $R_0$ is a rotation matrix of the reference image, $t_0$ is a translation matrix of the reference image, $R_1$ is a rotation matrix of the corresponding source image, $t_1$ is a translation matrix of the corresponding source image, and R is the image rectification rotation matrix of the source images and the reference image.

3. The model generation method according to claim 1, wherein the cost volumes of the reference image and the source images are calculated based on the following formula:

$$C(q,i,j) = F_0(:,i,j)' \cdot g(F_1, q)(:,i,j);$$

$$F_0 \in P^{c \times h \times w}$$

wherein c represents the quantity of feature degree channels of a feature map, h represents a width of the feature map, w represents a height of the feature map, $F_0$ is a feature map of the reference image, $F_1$ is a feature map of the source images, $C(q, i, j)$ is the cost volume of the reference image and the source images, wherein i is a row position of the cost volume, j is a column position of the cost volume, q is a set phase difference value, and $g(F_1, q)$ represents that the feature map $F_1$ is translated for q pixels in whole in a direction w.

4. The model generation method according to claim 1, wherein the rectified cost volumes of the source images and the reference image are calculated through the following formula:

$$C'(m,n,p) = R_0 \cdot R' \cdot C(q,i,j);$$

wherein $R_0$ is a rotation matrix of the reference image, R is the image rectification rotation matrix of the source images and the reference image, and $C'(m, n, p)$ is the rectified cost volume of the source images and the reference image.

5. The model generation method according to claim 1, wherein the step of performing the fusion operation on the rectified cost volumes of the plurality of source images corresponding to the reference image to obtain the final cost volume is:

performing the fusion operation on the rectified cost volumes of the plurality of source images corresponding to the reference image by using an element-wise max-pooling operation to obtain the final cost volume.

6. The model generation method according to claim 1, wherein the step of calculating the phase difference distribution estimation of the reference image under the set resolution based on the final cost volume, and calculating the estimated phase difference under the set resolution is:

calculating the phase difference distribution estimation of the reference image based on the final cost volume by using a preset neural network, and calculating the estimated phase difference under the set resolution; wherein under the set resolution, a size of a detected object in the reference image is 0.3% to 10% of a size of the reference image.

7. The model generation method according to claim 1, wherein the depth map of the reference image is generated through the following formula:

$$z = \frac{f \cdot b}{d};$$

wherein f is a focal length of a camera corresponding to the reference image, b is a base line length in a multi-view panoramic image stereo system, and d is the estimated phase difference.

8. A model generation method based on a multi-view panoramic image, comprising:
obtaining a reference image and a plurality of corresponding source images, wherein the source images and the reference image have a coinciding viewing angle;
performing a folding dimensionality reduction operation on a first-level reference image to obtain at least one lower-level reference image corresponding to the first-level reference image, and performing a folding dimensionality reduction operation on a first-level source image to obtain at least one lower-level source image corresponding to the first-level source image;
performing feature extraction on the lower-level reference image by using a first preset residual convolutional network so as to obtain a lower-level reference image feature, and performing feature extraction on the lower-level source image by using the first preset residual convolutional network so as to obtain a lower-level source image feature;
obtaining a final cost volume of a lower-level reference image of a corresponding set level based on a lower-level reference image feature of a set level and a source image feature of a set level, and calculating a lower-level reference image phase difference distribution estimation feature of the reference image under a set resolution based on the final cost volume;
obtaining lower-level reference image phase difference distribution estimation features of other levels of the reference image based on lower-level reference image features of other levels and source image features of other levels;
performing feature extraction on the lower-level reference image phase difference distribution estimation features by using a second preset residual convolutional network to obtain discriminative features of the lower-level reference images;
obtaining estimated phase differences of the lower-level reference images based on the discriminative features of the lower-level reference images;
performing a tiling dimensionality raising operation on the discriminative features so as to obtain a rectified discriminative feature of the first-level reference image, and performing a tiling dimensionality raising operation on the estimated phase differences so as to obtain a rectified phase difference of the first-level reference image;
obtaining a final phase difference of the first-level reference image according to the reference image, the source images, the rectified discriminative feature of the first-level reference image and the rectified phase difference of the first-level reference image; and
generating a depth map of the reference image based on the final phase difference of the first-level reference image, and constructing a corresponding stereo vision model according to the depth map.

9. A model generation apparatus based on a multi-view panoramic image, comprising:
an image obtaining module, configured to obtain a reference image and a plurality of corresponding source images, wherein the source images and the reference image have a coinciding viewing angle;
an image rectification rotation matrix calculating module, configured to obtain source camera parameters of the source images and a reference camera parameter of the reference image, and calculate an image rectification rotation matrix of the source images and the reference image based on the source camera parameters and the reference camera parameter;
a cost volume calculating module, configured to extract a reference image feature of the reference image and source image features of the source images, and calculate cost volumes of the reference image and the source images based on the reference image feature and the source image features;
a cost volume transformation module, configured to perform coordinate system transformation on the cost volumes by using the image rectification rotation matrix to obtain rectified cost volumes of the source images and the reference image;
a cost volume fusion module, configured to perform a fusion operation on the rectified cost volumes of the plurality of source images corresponding to the reference image to obtain a final cost volume;
a set estimated phase difference calculating module, configured to calculate a phase difference distribution estimation of the reference image under a set resolution based on the final cost volume, and calculate an estimated phase difference under the set resolution;
a phase difference fusion module, configured to fuse an estimated phase difference of the reference image under each layer of resolution to obtain a final phase difference of the reference image; and
a model constructing module, configured to generate a depth map of the reference image based on the final phase difference of the reference image, and construct a corresponding stereo vision model according to the depth map.

10. The model generation apparatus according to claim 9, characterized in that the image rectification rotation matrix calculating module calculates the image rectification rotation matrix of the source images and the reference image based on the $v_x = (c_1 - c_0) \cdot \text{sign}(R_0(1,:) \cdot R_0' \cdot t_1)$;

$v_y = \text{cross}(R_1(3,:), v_x)$;

$v_z = \text{cross}(v_x, v_y)$;

$R = [v_x/\|v_x\|_2, v_y/\|v_y\|_2, v_z/\|v_z\|_2]'$;

$c_0 = -R_0' \cdot t_0$;

$c_1 = -R_1' \cdot t_1$;

wherein $R_0$ is a rotation matrix of the reference image, $t_0$ is a translation matrix of the reference image, $R_1$ is a rotation matrix of the corresponding source image, $t_1$ is a translation matrix of the corresponding source image, and R is the image rectification rotation matrix of the source images and the reference image.

11. The model generation apparatus according to claim 9, wherein the cost volume calculating module calculates the cost volumes of the reference image and the source images based on the following formula:

$$C(q,i,j)=F_0(:,i,j)'\cdot g(F_1,q)(:,i,j);$$

$$F_0 \in P^{c \times h \times w}$$

wherein c represents the quantity of feature degree channels of a feature map, h represents a width of the feature map, w represents a height of the feature map, $F_0$ is a feature map of the reference image, $F_1$ is a feature map of the source images, C(q, i, j) is the cost volume of the reference image and the source images, wherein i is a row position of the cost volume, j is a column position of the cost volume, q is a set phase difference value, and $g(F_1, q)$ represents that the feature map $F_1$ is translated for q pixels in whole in a direction w.

12. The model generation apparatus according to claim 9, wherein the cost volume transformation module calculates the rectified cost volumes of the source images and the reference image through the following formula:

$$C'(m,n,p)=R_0\cdot R'\cdot C(q,i,j);$$

wherein $R_0$ is a rotation matrix of the reference image, R is the image rectification rotation matrix of the source images and the reference image, and C'(m, n, p) is the rectified cost volume of the source images and the reference image.

13. The model generation apparatus according to claim 9, wherein the cost volume fusion module is configured to perform the fusion operation on the rectified cost volumes of the plurality of source images corresponding to the reference image by using an element-wise max-pooling operation to obtain the final cost volume.

14. The model generation apparatus according to claim 9, wherein the set estimated phase difference calculating module is configured to calculate the phase difference distribution estimation of the reference image under the set resolution based on the final cost volume by using a preset neural network, and calculate the estimated phase difference under the set resolution; wherein under the set resolution, a size of a detected object in the reference image is 0.3% to 10% of a size of the reference image.

15. The model generation apparatus according to claim 9, wherein the model constructing module generates a depth map of the reference image through the following formula:

$$z = \frac{f \cdot b}{d};$$

wherein f is a focal length of a camera corresponding to the reference image, b is a base line length in a multi-view panoramic image stereo system, and d is the estimated phase difference.

* * * * *